July 5, 1960  L. PÉRAS  2,943,368
SEMI-AUTOMATIC MACHINE FOR THE CENTRIFUGAL
CASTING OF CYLINDER LINERS
Filed Jan. 29, 1957  17 Sheets-Sheet 1

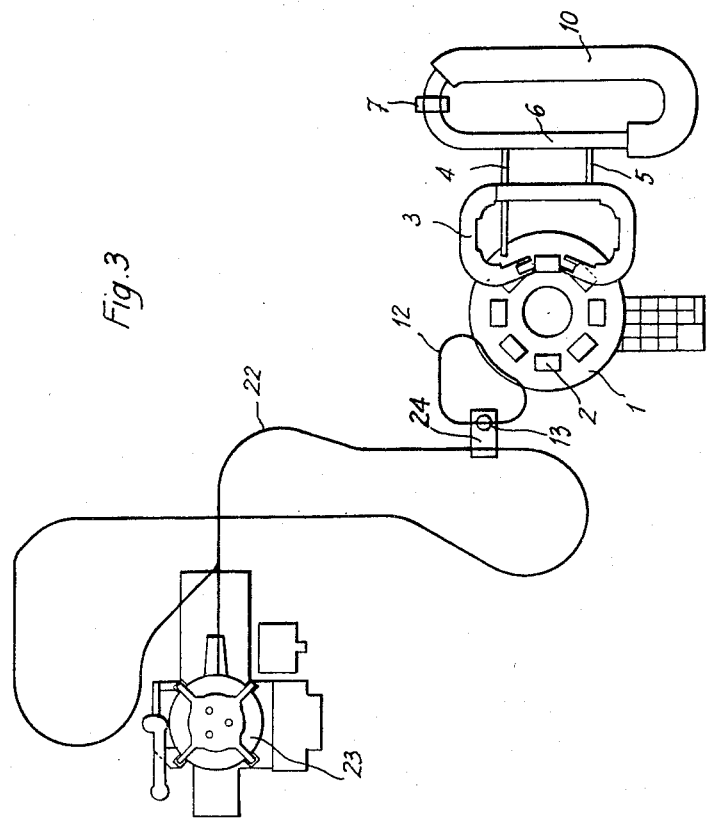
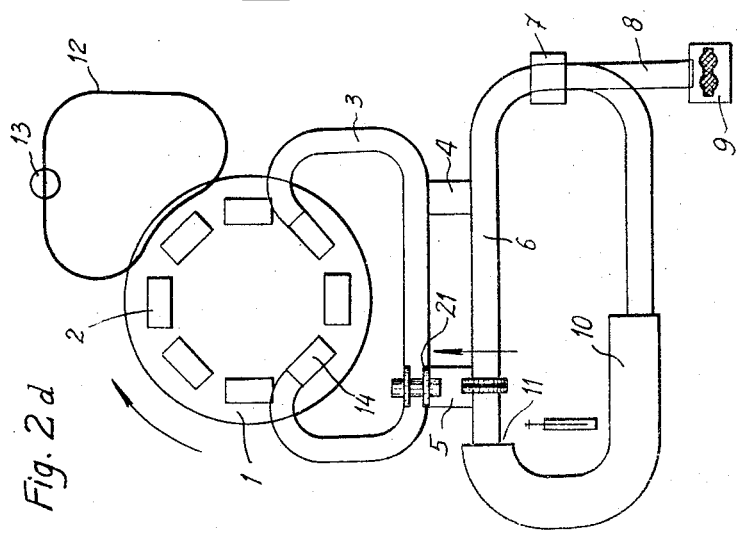

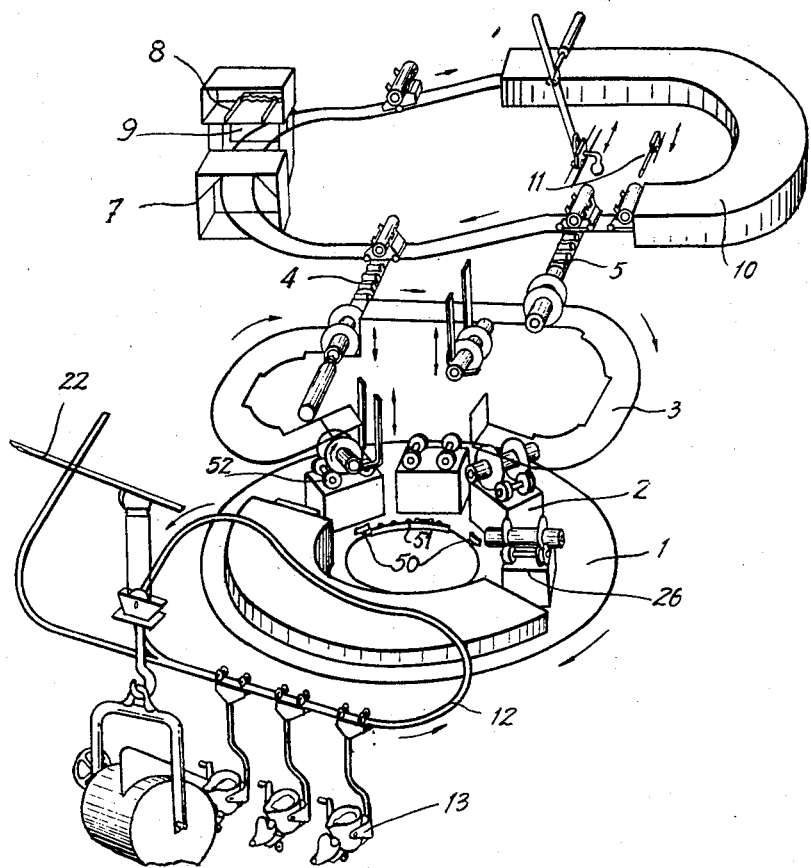

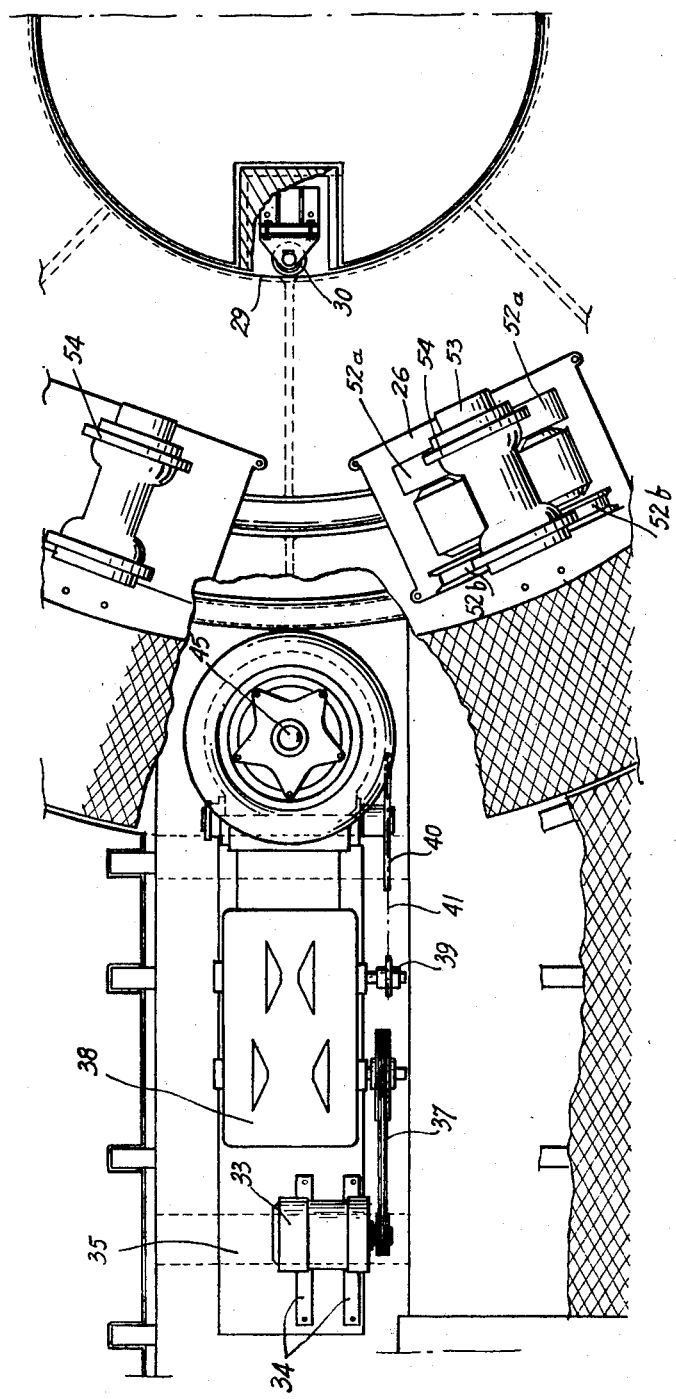
Fig. 5.b

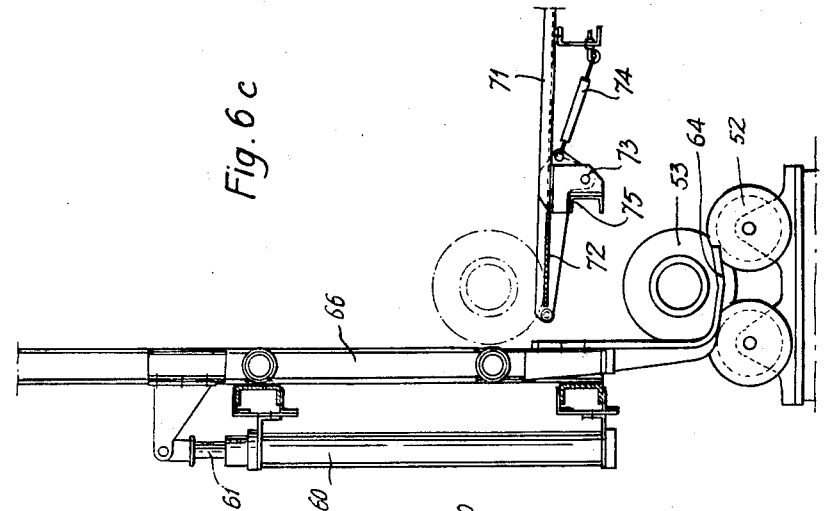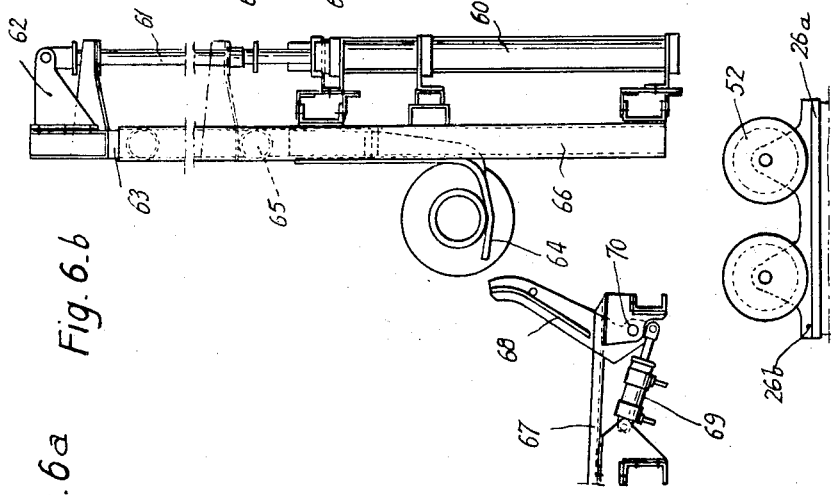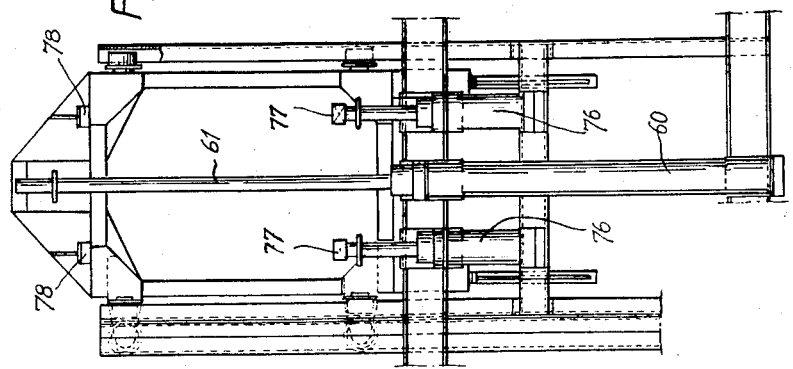

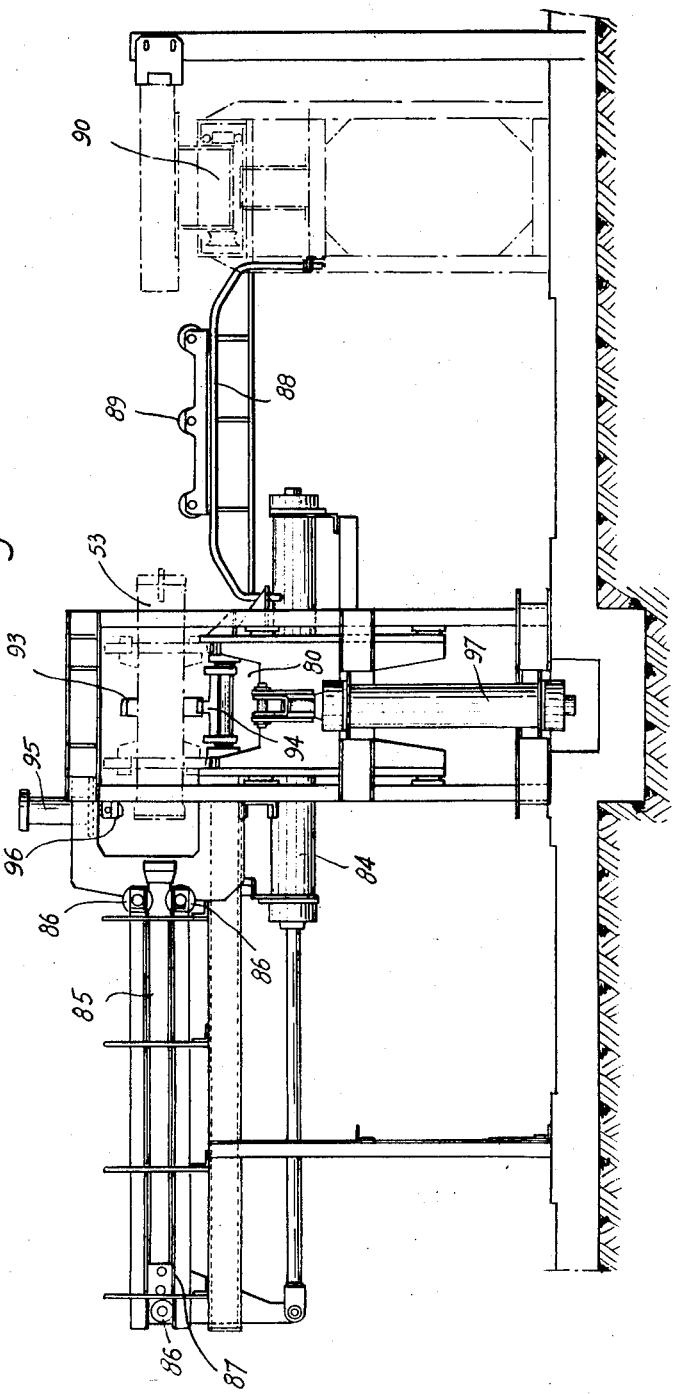

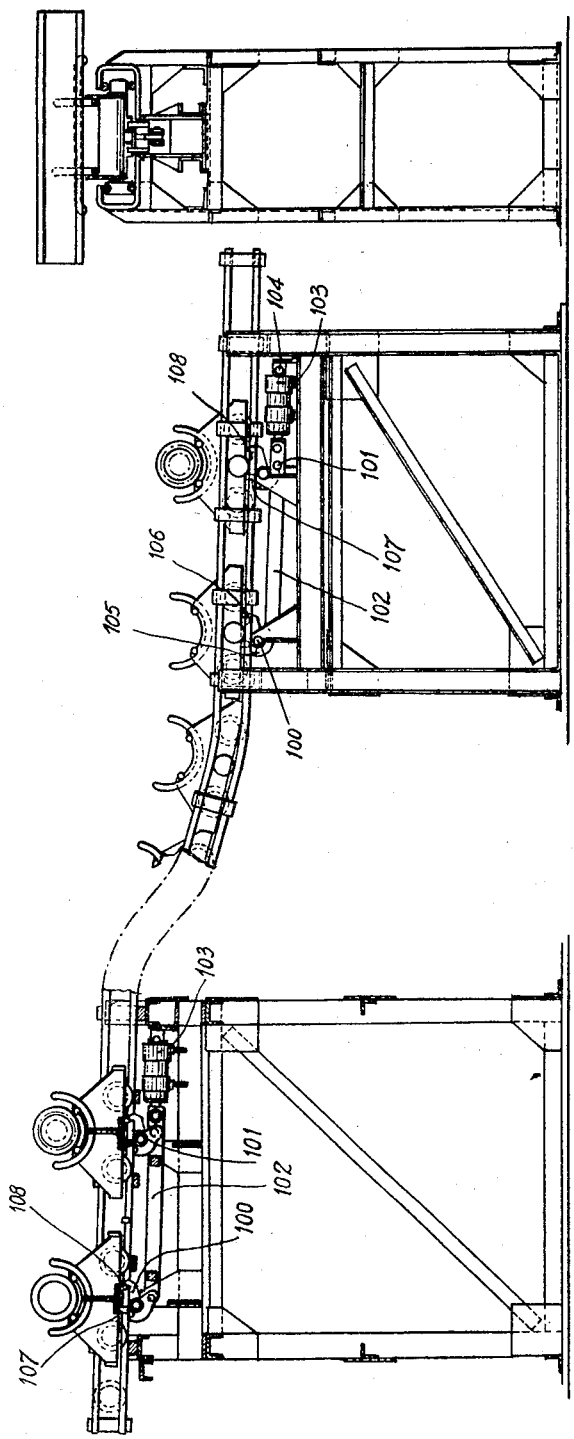

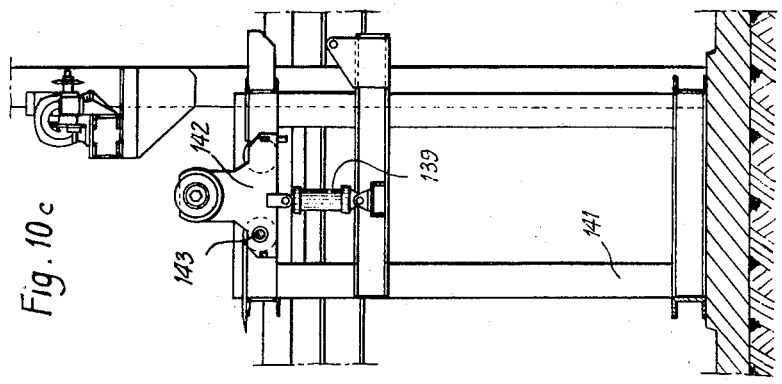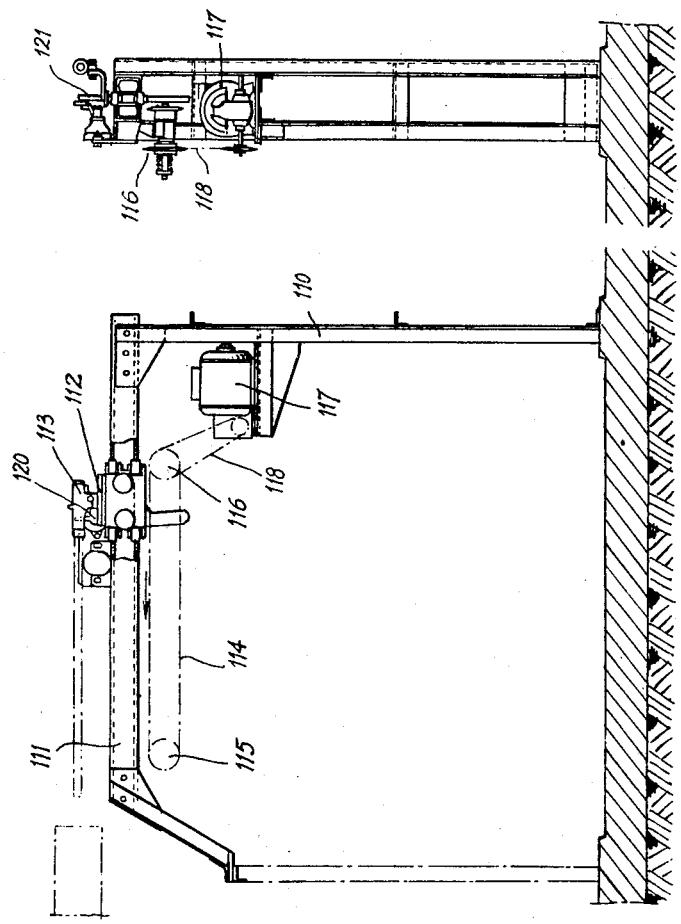

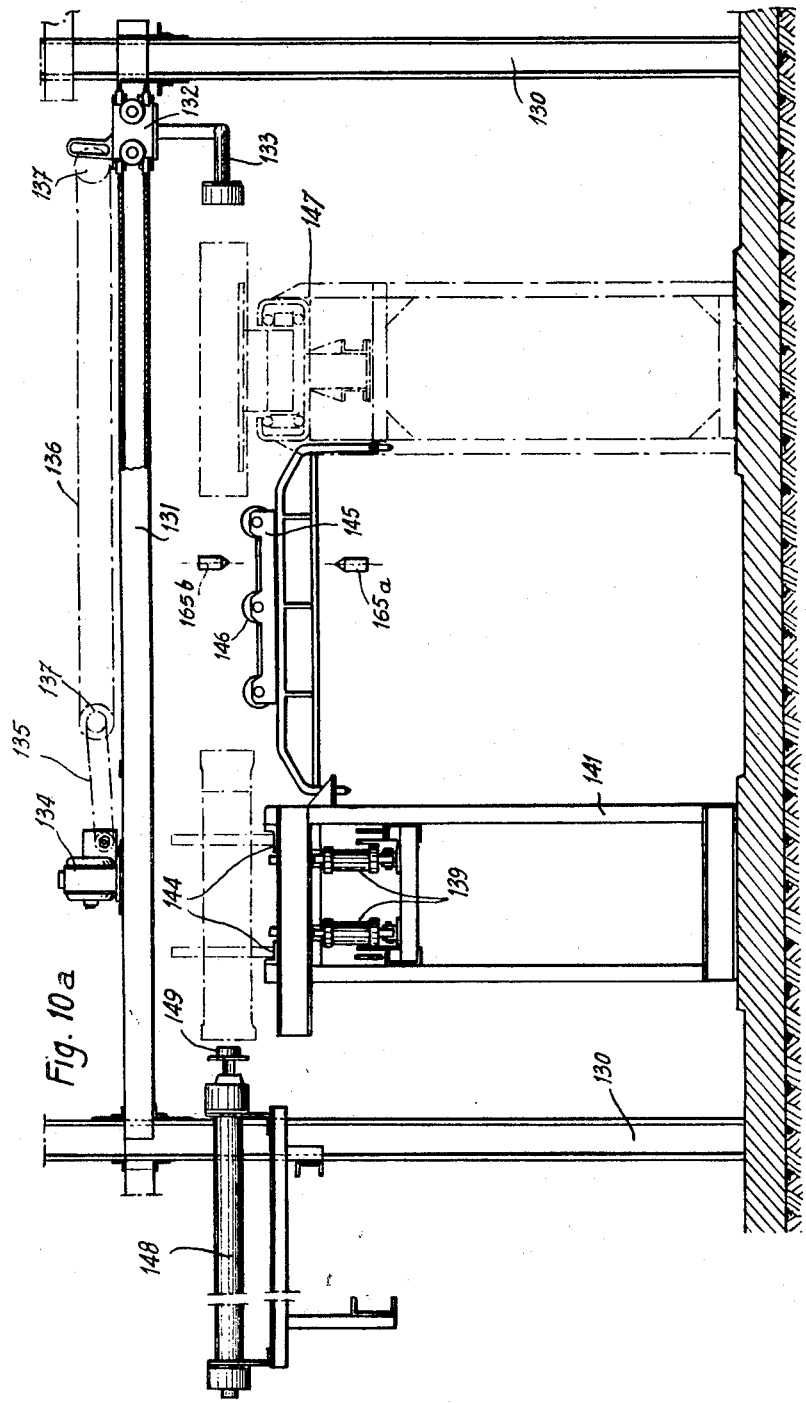

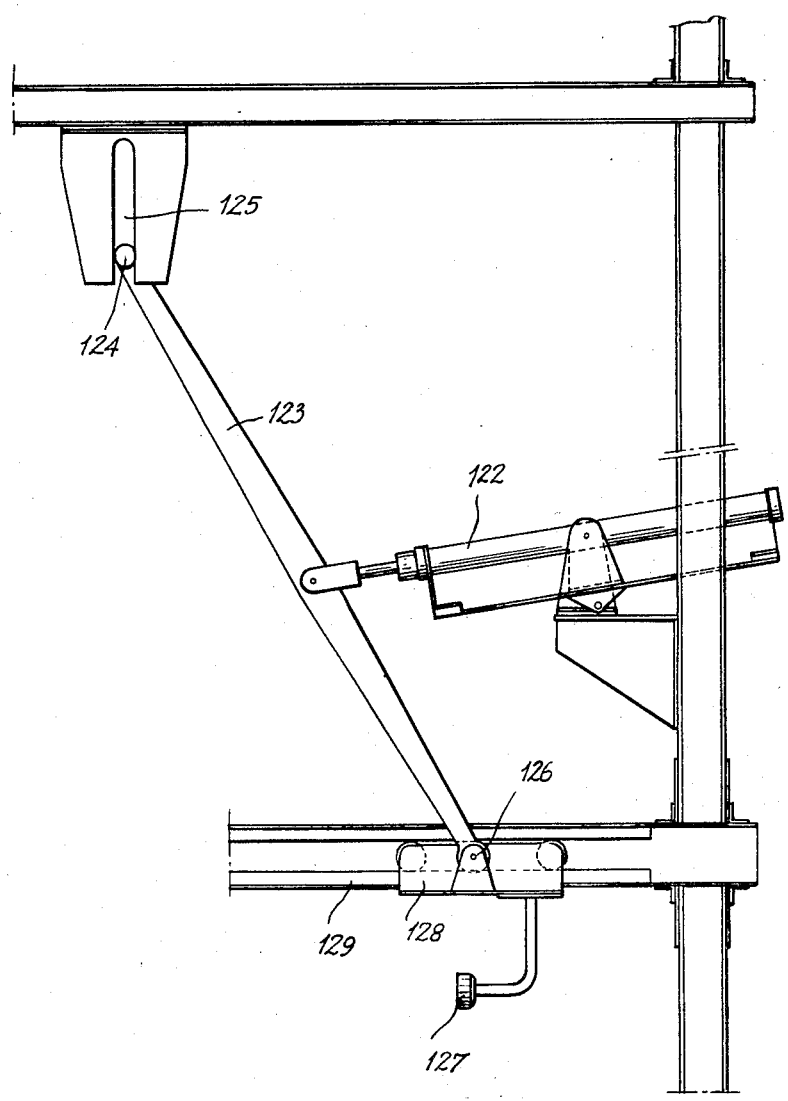
Fig. 10.d

July 5, 1960
L. PÉRAS
2,943,368
SEMI-AUTOMATIC MACHINE FOR THE CENTRIFUGAL
CASTING OF CYLINDER LINERS
Filed Jan. 29, 1957
17 Sheets-Sheet 14
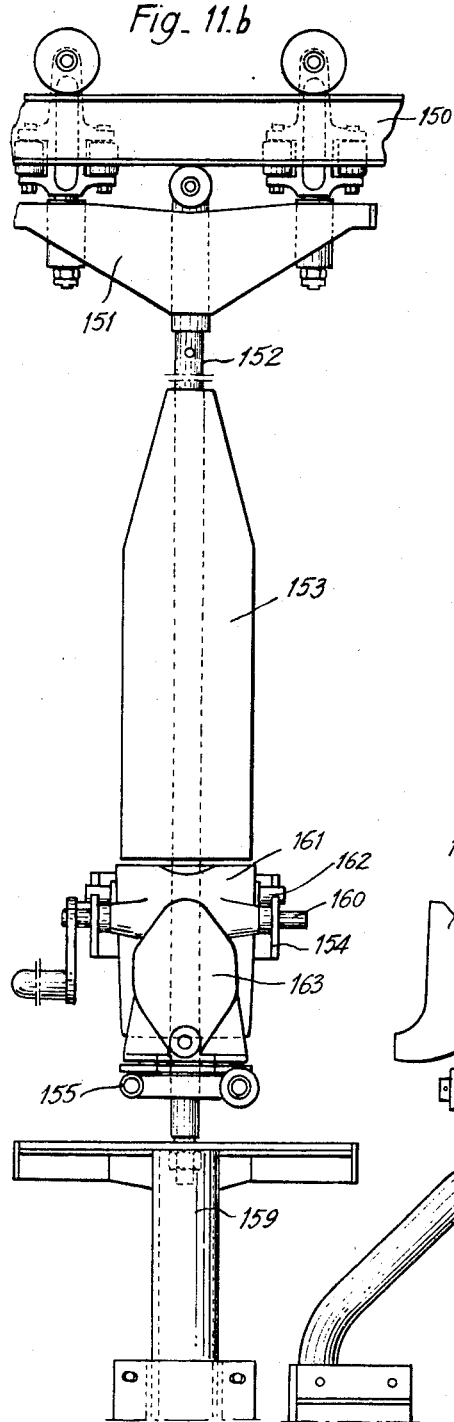
Fig. 11.b
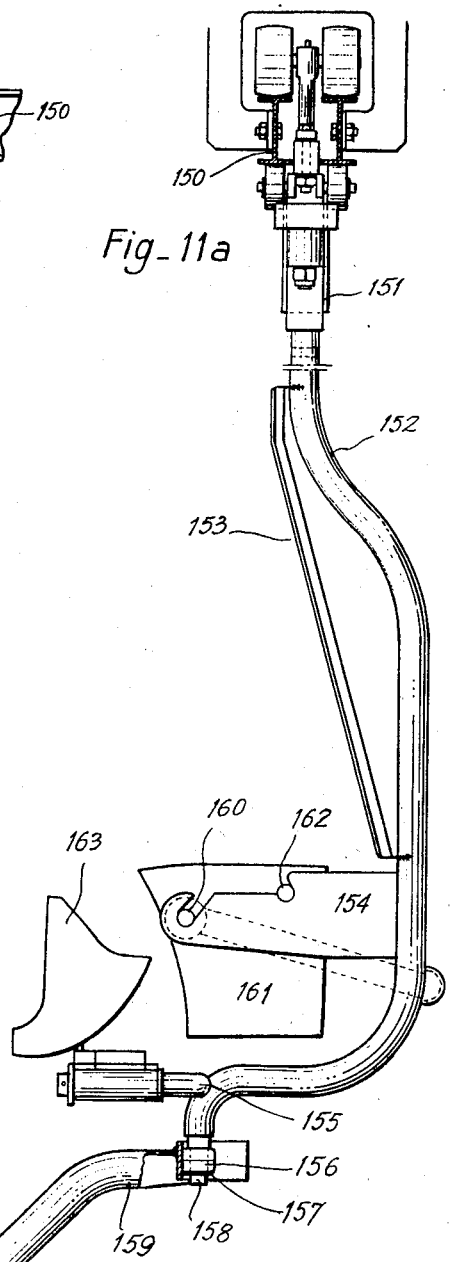
Fig. 11a

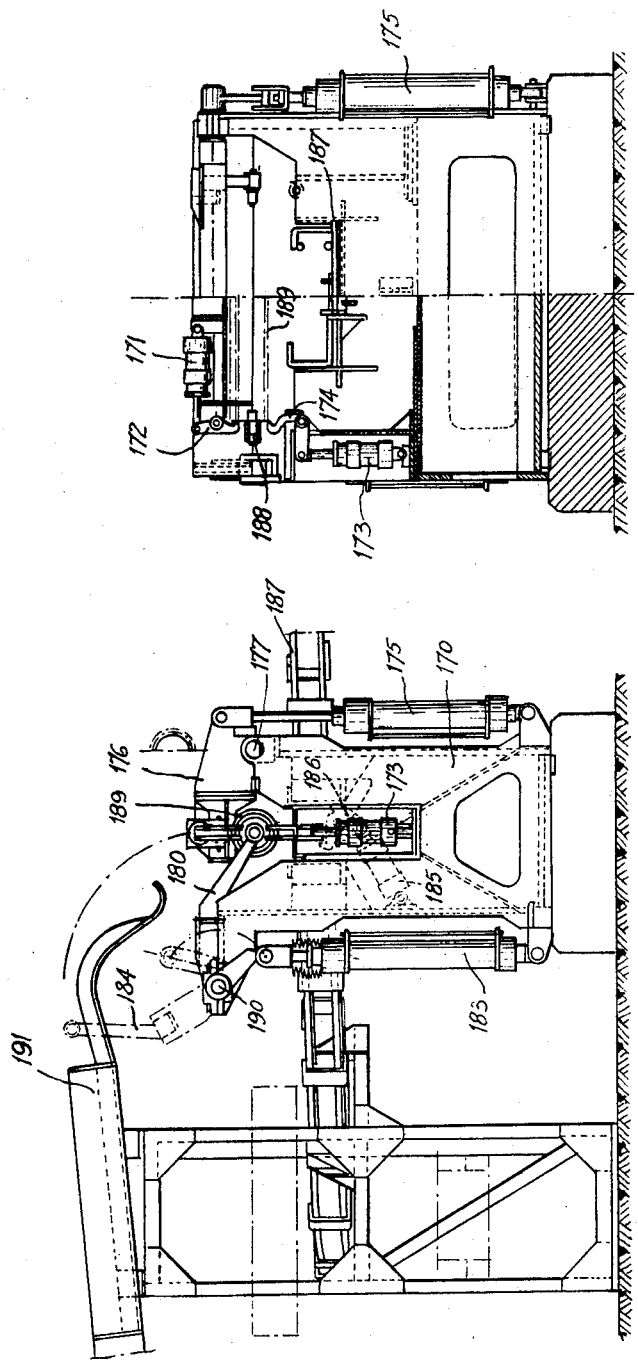

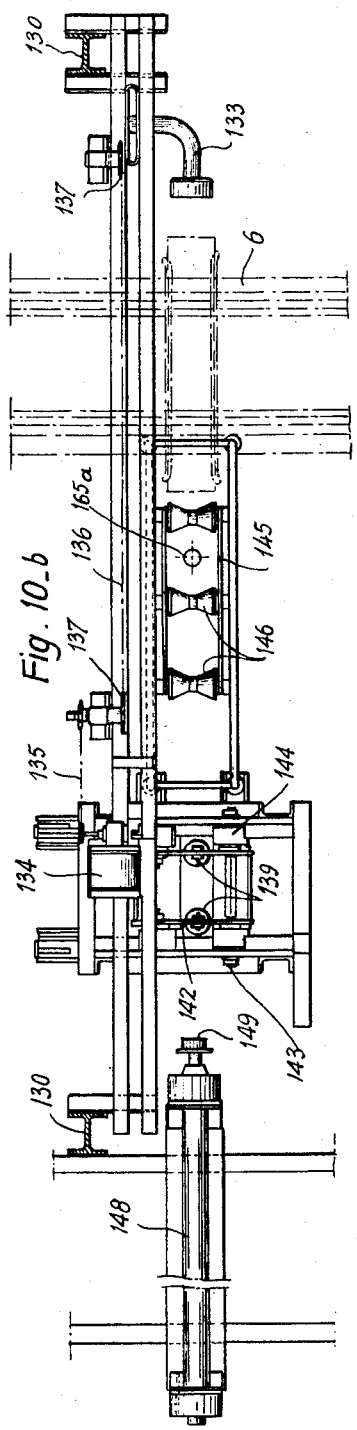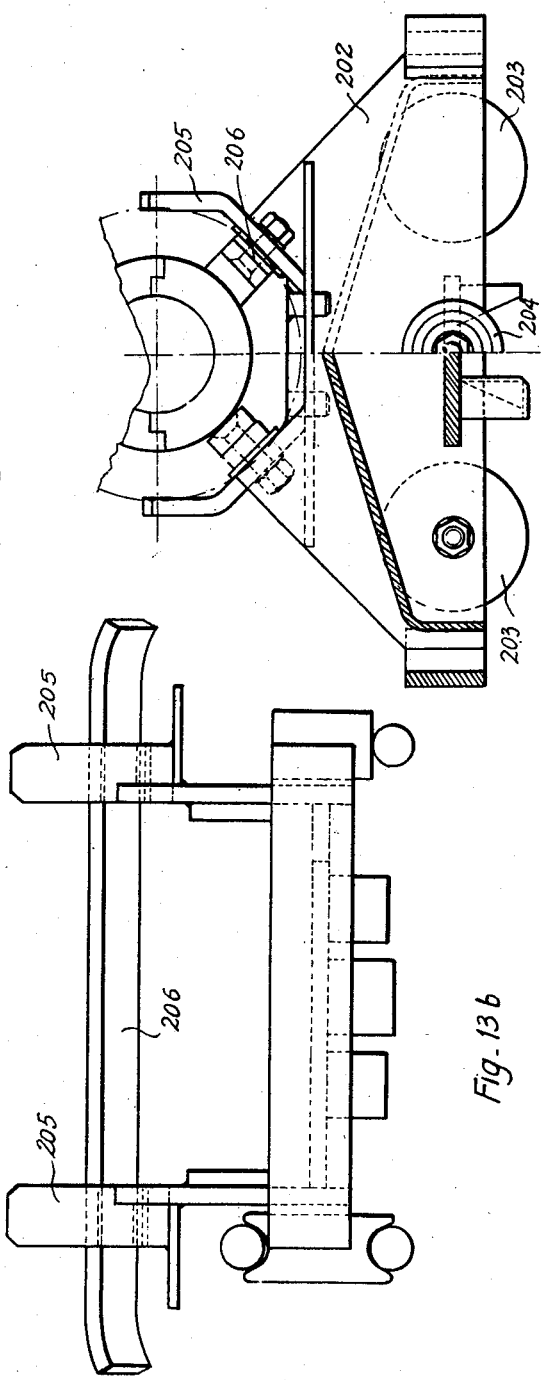

Fig. 12a
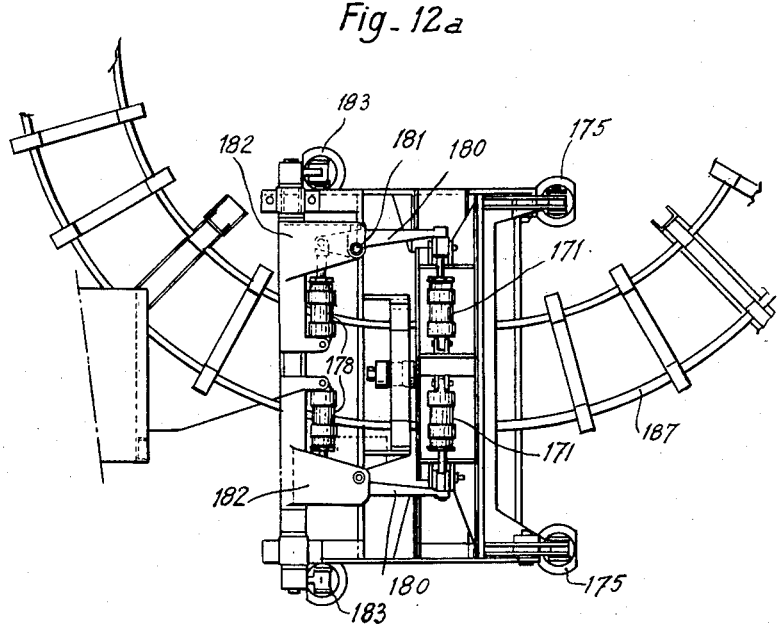
Fig. 14.a
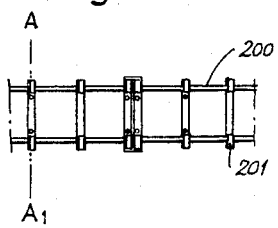
Fig. 14.b
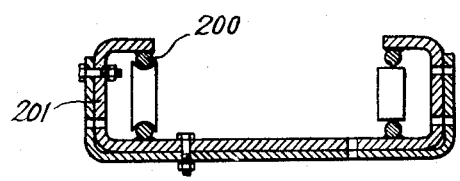

United States Patent Office 2,943,368
Patented July 5, 1960

2,943,368

SEMI-AUTOMATIC MACHINE FOR THE CENTRIFUGAL CASTING OF CYLINDER LINERS

Lucien Péras, Billancourt, France, assignor to Regie Nationale des Usines Renault, Billancourt, France Filed Jan. 29, 1957, Ser. No. 636,989

Claims priority, application France Feb. 3, 1956

9 Claims. (Cl. 22—64)

This invention relates to the centrifugal casting of cylinder liners and has specific reference to an improved semi-automatic machine for casting by the centrifugal method the cylinder liners of engines.

All existing installations for the centrifugal casting of engine cylinder liners require a considerable staff subjected to continuous heavy work due to the sustained physical effort required.

The arrangement forming the subject-matter of this invention is advantageous in that it permits the continuous manufacture, by means of automatic devices, of engine cylinder liners in the form of cast-iron tubes requiring minimum machining and having such a length that they can subsequently be cut into several liners.

According to the present invention, the installation comprises primarily a circular horizontal plate or "roundabout" driven at a constant rotational speed about its vertical axis and supporting a plurality of centrifugal casting machines, so that the latter move in succession past the following stations:

(a) A loading station where they receive the die or mould comprising two half-dies in a die-carrier;

(b) A casting station;

(c) An unloading station where the aforesaid die-carrier carrying the filled die or mould is discharged.

This "roundabout" is fed through two other circuits, i.e. (1) a circuit along which small casting ladles containing the unitary volume of liquid metal necessary for casting one tube are circulated, and (2) another circuit for the die-carriers, in which the latter are moved in succession past the following stations: a roundabout discharging station, a stripping station where the filled dies are removed from the die-carriers, a "replenishment" station where the die-carriers receive fresh or empty dies, and a roundabout loading station.

This circuit is completed by another circuit for removing the moulded tubes from the dies, cleaning and preparing the die surfaces and finally replacing the dies in the die-carriers.

The invention consists essentially in an improved arrangement and combination of various circuits and their component elements. It is also concerned with an arrangement which is particularly advantageous from the point of view of handling and automatically, whereby the manual work is reduced to a minimum.

In order to afford a clearer understanding of the present invention and of the manner in which the same may be carried out in practice, reference will now be made to the attached drawings forming part of this specification and illustrating diagrammatically by way of example a typical embodiment of the invention. In the drawings:

Figures 2a, 2b, 2c and 2d are diagrams similar to Fig. 1 illustrating different operations accomplished by the installation;

Figure 3 is a complete diagrammatic view of the installation;

Figure 4 is a perspective, diagrammatic and fragmentary view showing the essential elements of the installation;

Figures 5a and 5b are part-sectional detail views showing the platform structure in elevation and in plane;

Figures 6a and 6b are elevational front and side views, respectively, showing the device for positioning the die-carriers on the centrifugal machines;

Figure 6c is an elevational view showing the device for removing the die-carriers from the centrifugal machines;

Figures 7a, 7b and 7c are an elevational view, a plan view, and a side view respectively, of the station where the dies are removed from their corresponding die-carriers, i.e. the so-called die-stripping station;

Figures 8a and 8b are elevational side and front views, respectively, of the device for feeding the trolleys along the tube-extracting and die-cleaning circuit;

Figures 9a and 9b are elevational side and front views, respectively, of the device for preparing the inner surfaces of the dies;

Figures 10a, 10b and 10c are an elevational side view, a plan view and a front elevational view, respectively, showing the die-replenishment station;

Figure 10d is a modified embodiment of the die-feeding device of Fig. 10b;

Figures 11a, 11b are a side view and a front view, respectively, of a suspended casting device, showing the relative suspension and anchorage system;

Figures 12a, 12b and 12c are a plan view and a side elevational view, and an end elevational view, respectively, of the device provided for extracting the tubes from the dies;

Figures 13a and 13b are a side view and a front view of a trolley, respectively;

Figure 14a is a plan view showing one portion of a typical track circuit; and

Figure 14b is a cross-section showing on a larger scale the structure of the track of Fig. 14a, the section being taken along the line A—A of Fig. 14a.

The general principle of the installation constituting the subject-matter of the present invention is as follows:

The casting dies are placed in die-carriers and the resulting assemblies are placed in turn on the centrifugal-casting machines by means of which they are rotated about their axes. Then the dies are fed with liquid metal to be centrifuged.

When the centrifugation is terminated by stopping the centrifugal-casting machines, these assemblies are directed to the unloading stations and subsequently to the stripping station where the filled dies are separated from their carriers, the latter being returned to the replenishment station.

The dies are deposited on trolleys which convey them to an extraction station where the cast tubes to be stocked are removed from the dies, the die-surface conditioning and preparing station and the replenishment stations where the dies are re-introduced in the die-carriers.

This installation has associated therewith another installation for pouring the requisite quantity of liquid metal into each die, the metal being taken from a suitable furnace.

Figure 2A:
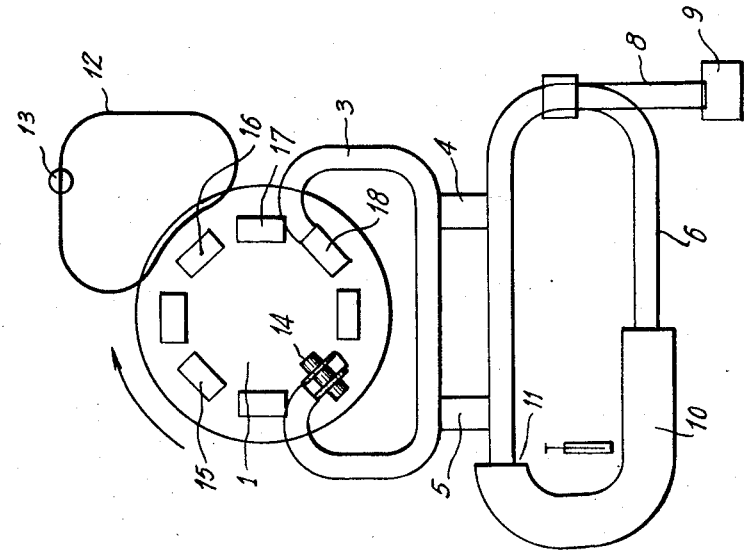
Figure 1:
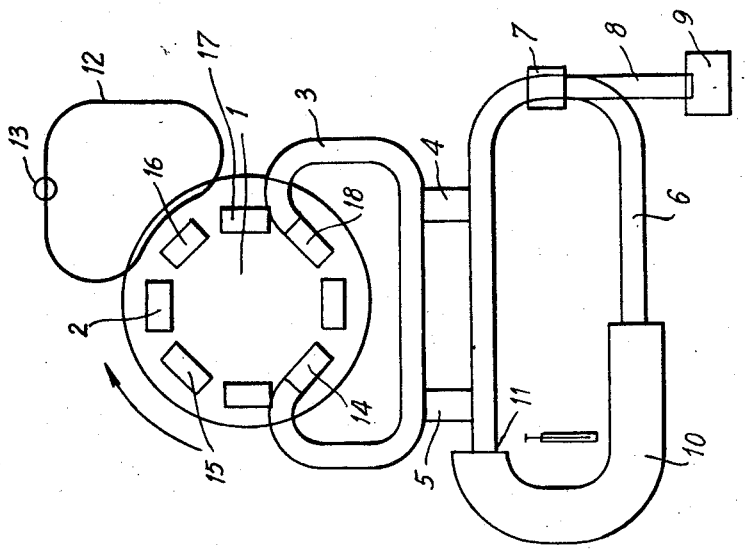
Figure 1 is a diagram illustrating the main portion of the installation for the semi-automatic centrifugal casting of engine cylinder liners according to the teachings of this invention.
Figure 2C:
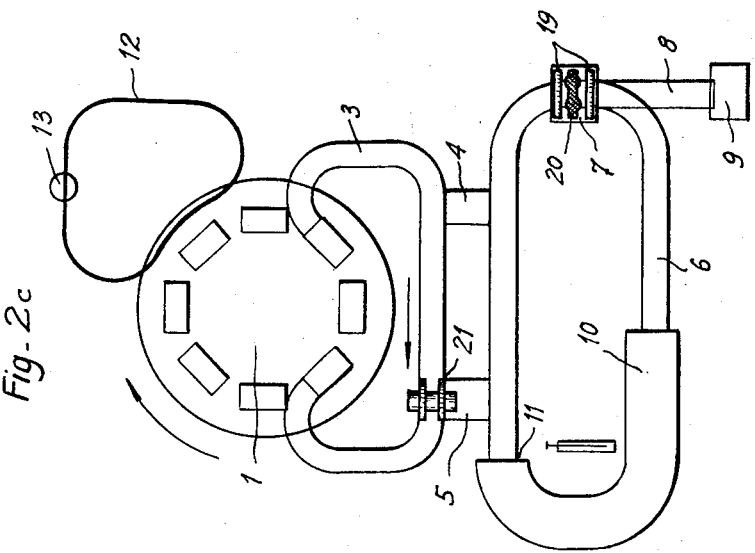
Figure 2B:
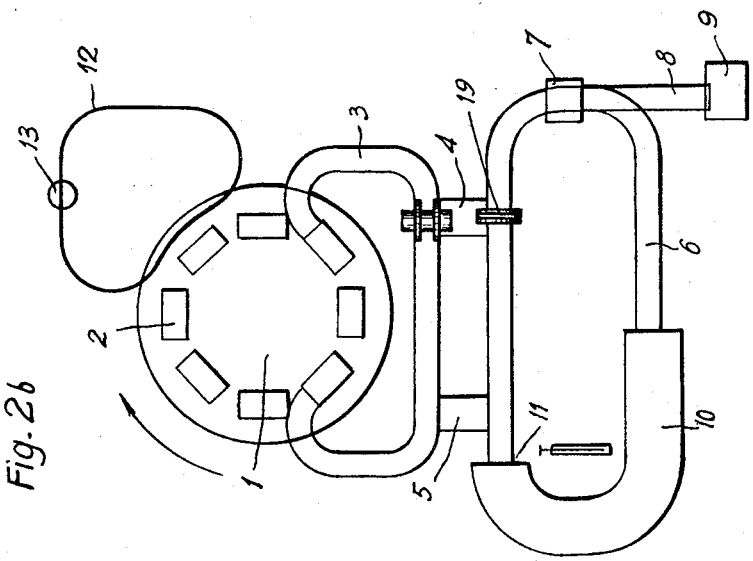

Considering more in detail the automatic centrifugal casting installation illustrated diagrammatically in Fig. 1 and in perspective in Fig. 4, this installation comprises:

(I) A circular, horizontal platform 1 called a "roundabout," equipped with eight centrifugal-casting machines 2 and adapted to rotate about its axis at a constant speed, so that each machine 2 will move past a station 14 where the die-carriers are placed on the centrifugal machines, and a station 18 where the die-carriers are removed from the centrifugal machines.

(II) A die-carrier circuit 3 serving the stripping station 4 and replenishment station 5 from the unloading station 18 to the loading station 14.

(III) An external circuit 6 for the dies proper, serving the stripping station 4, the extraction station 7 comprising the ramp 8 for conveying the tubes to the stocking place 9, the conditioning station 10, the die-surface conditioning station 11 and the replenishment station 5.

(IV) A circuit 12 for small casting-ladles 13 supplying unitary volumes of liquid metal in crucibles suspended from an overhead conveyor, each crucible containing the quantity of cast-iron required for each casting machine.

Roundabout

Figure 5A:
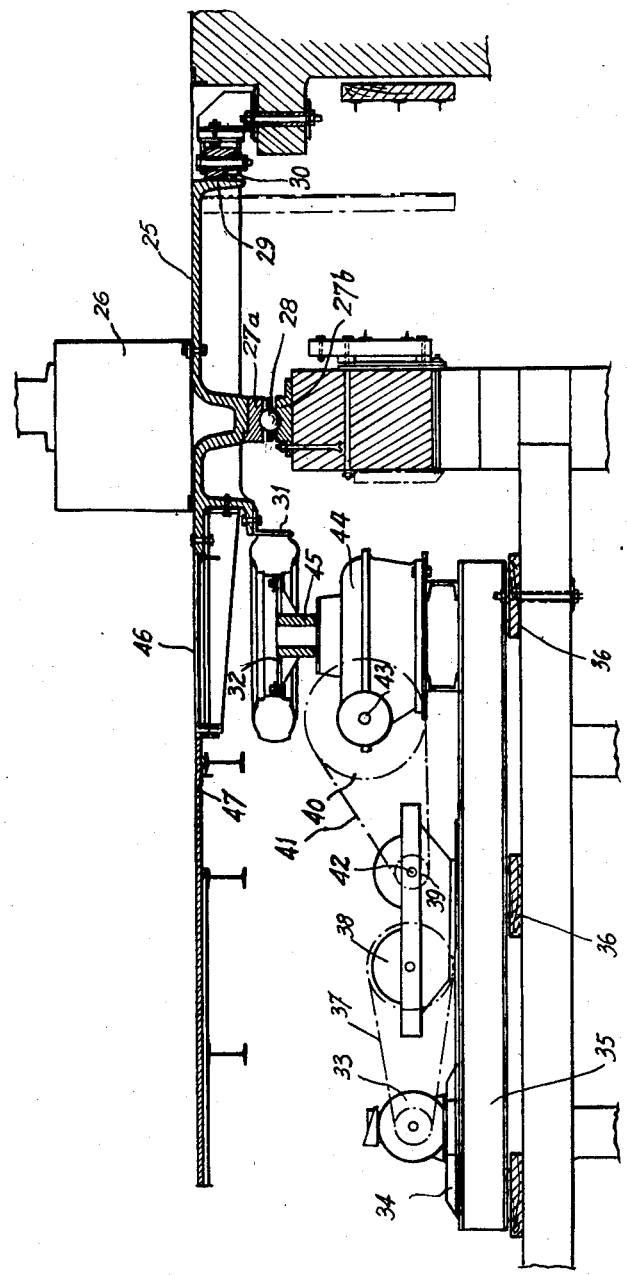

The roundabout illustrated more in detail in Figs. 5a and 5b comprises a fixed central portion and a revolving annular platform 25 supporting the centrifugal-casting machines 26; this platform 25 is adapted to roll on balls 28 disposed between registering races 27a, 27b, and centered by another race 29 engaged by reaction rollers 30. The driving mechanism of the machine is arranged in a pit beneath this machine and for this purpose the platform carries a circular track 31 adapted to be engaged by a driving wheel 32 which may advantageously consist of an ordinary automobile wheel the tire of which engages the circular track 31 to constitute a friction drive therefor.

An electric motor 33 secured on adjustable slide-bars 34 supported by a base 35 of welded steel sections mounted on wedges 36 of hard wood is adapted to drive, through the medium of a pair of belts 37, a variable-speed gear 38. The output shaft 42 of the variable-speed gear is connected through a chain 41 to another variable-speed gear 44, chain 41 passing over two sprockets 39, 40, providing an adequate gear ratio. The output shaft 45 of the other variable-speed gear 44 is vertical and has keyed thereon the driving wheel 32.

The roundabout comprises in addition an annular foot-plate 46 concentric to and bolted on the revolving platform 25.

A set of cams 50 (Fig. 4) mounted on the lower portion of the platform 25 are adapted to actuate fixed pneumatic electro-valves or like devices as the platform rotates, to control the loading and unloading of the roundabout.

Each centrifugal casting machine 26 (Figs. 4 and 5b) consists essentially of a structure containing a motor (not shown) for rotating the die-carrier, two pairs of parallel rollers having horizontal axes, i.e. smooth or plain rollers 52a, and guide rollers 52b rotatably driven by the motor under the control of a suitable cam system. These rollers are adapted to receive the die-carriers, each consisting of a die-receiving tubular element 53 provided with external rolling rings or discs 54; a more detailed description and illustration of these die-carriers will be found in Patent No. 2,727,288, filed on May 8, 1953, for "Apparatus for Centrifugal Casting." As these rollers are driven for rotation, they drive in turn the die-carrier laid thereon and, consequently, the die disposed in a predetermined, fixed position inside the die-carrier.

*Devices for loading and unloading the die-carriers on the centrifugal casting machines (stations 14 and 18 of the diagram of Fig. 1)*

The apparatus for positioning the die-carriers, as shown in Figs. 6a and 6b of the drawings, comprises a pneumatic cylinder 60 adapted to actuate a piston-and-rod assembly 61 supporting through the intermediary of the cylinder bracket 62 and slide-bars 63 a fork 64 adapted to carry the die-carriers. These slide-bars 63 are guided in turn by rollers 65 in U-sectioned slide-ways 66. A die-carrier supply ramp 67 forming part of the circuit 3 and provided at its output end with a tilting bridge 68 pivoted about a transverse pivot pin 70 and actuatable through a pivoted pneumatic cylinder 69 permits the transfer of die-carriers to the lifting fork 64. Two delay-action cylinders 76 are adapted to stop, through inter-engaging check members 77 and 78, the assembly 62 so that the fork 64 is prevented from completing its downward stroke until the centrifugal casting machine 26 passes just beneath the die-carrier 53 waiting on the fork 64. Thus, the die-carrier will subsequently be deposited onto the rollers 52 of the centrifugal casting machine 26 for which it is intended.

The apparatus for removing the die-carriers consists essentially of the same elements, except for the bridge cylinders 76 which are dispensed with (Fig. 6c) and the tilting chute which is not controlled.

A discharge ramp 71 comprises at its upper end a tilting bridge 72 pivoted at 73 and urged to its normal position by a return spring 74 in which it is held by a stop 75.

Stripping station

Figures 7B, 7C:
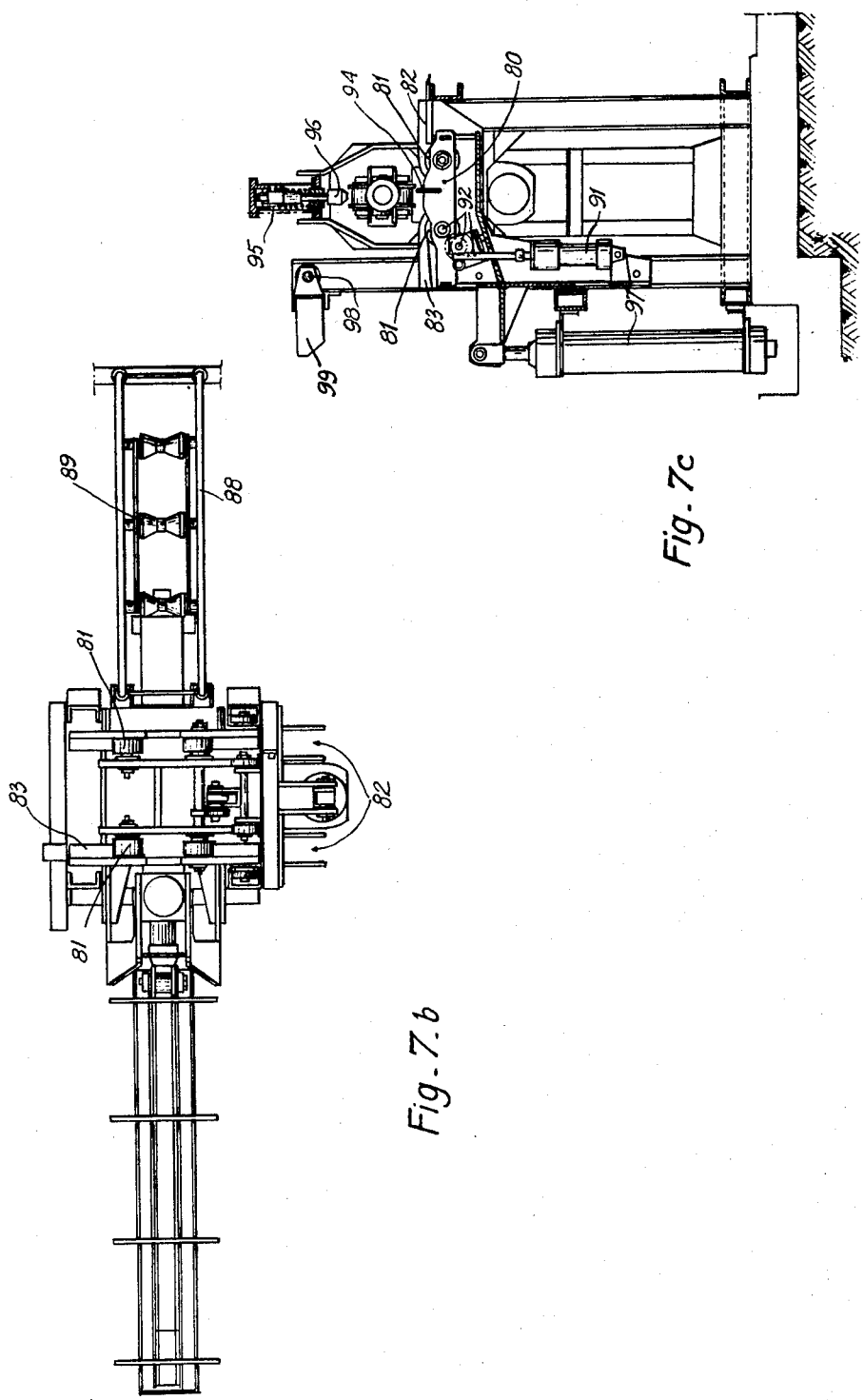

This station is illustrated diagrammatically in Fig. 1 at 4 and in detail in Figs. 7a, 7b and 7c.

It comprises a cradle 80 carrying four rollers 81 adapted to hold the die-carrier in position; these rollers are co-extensive with the input tracks 82 and output tracks 83 of the die-carriers (circuit 3, Fig. 1). A pneumatic cylinder 84 is adapted to actuate a push-member 85 guided by rollers 86 and slide-bars 87.

A roller support 88 carrying three rollers 89 enables the filled die to be transferred by the push member 85 from the die-carrier to a die-carrier conveying trolley 90 circulating on the circuit 6 (Fig. 1).

A pneumatic cylinder 91 is adapted, through the medium of a rack-and-pinion mechanism 92, to rotate two of the four rollers 81 and therefore the die-carrier 53 and the die located therein, this die consisting, as already set forth, of two semi-cylinders, so as to place the joint thereof in a horizontal position, the rotational movement of the die-carrier being limited by a stop 93 secured on the die-carrier and by the stop 94 secured on the framework of the machine.

A small pneumatic cylinder 95 provided with a push-rod 96 is adapted to hold the die-carrier in its horizontal position and prevent it from being lifted when it is pushed by the push member 85.

With the larger front cylinder 97, it is possible to lift the complete cradle assembly 80 and to discharge the die-carrier by means of the conveyor tracks 83 by tilting the cradle by means of the check roller 98.

Devices for feeding the trolleys along the circuit 6

Figs. 8a and 8b illustrate the devices provided in the installation for feeding the trolleys along their circuit. Each trolley-feeding device consists of a pair of check members 100, 101 interconnected through a connecting-rod 102 adapted to be actuated from the pneumatic cylinder 103 pivoted on the pin 104. These check members 100, 101 are identical and formed with notches 105, 106, corresponding to a pair of stops 107, 108 carried by each trolley; these devices are designed to forward the die-carrying trolleys by gravity to the die-extracting station.

The surface preparation station (indicated at 11, Fig. 1) is illustrated more in detail in Figs. 9a and 9b.

A frame structure 110 supports a twin-rail track 111 having movably mounted thereon the gun carrier 112 supporting in turn the gun 113. A roller chain 114 engaging sprockets 115, 116 driven from a motor 117 through another intermediate chain 118 is adapted to reciprocate the gun carrier 112 along the rail track 111.

A control arm 121 is adapted when actuated by a suitable member 120 of the distributor to release a silicate jet on both forward and backward movements of the spray gun.

Replenishment station (Fig. 1, reference 5)

This station is intended for re-introducing the empty, cleaned and graphite-lubricated dies into the die-carriers of circuit 3, and is constructed as exemplified in Figs. 10a to 10d.

A push member is so mounted as to transfer a die from the trolley located on the circuit 6 to the die-carrier of circuit 3. To actuate this push member the arrangement, as illustrated in Fig. 10d, incorporates a pivoted pneumatic cylinder 122 connected to a lever 123 fulcrumed on a pivot pin 124 and secured at one end in a fixed slot 125, the opposite end 126 of the lever 123 being adapted to actuate a carriage 128 carrying a push member 127 and rolling on rails 129.

According to a modified embodiment illustrated in Figs. 10a, 10b, 10c and 10d, the push member 133 is supported by a carriage 132 movable along a twin-rail track 131 supported by uprights 130. Overlying this track 131 is a motor 134 driving, through an intermediate chain 135, another roller chain 136 engaging two sprockets 137, so as to drive, through the slotted member 138, the carriage 132 supporting the push member 133 to reciprocate the latter along the track 131.

To support the die-carrier on the circuit 3, the arrangement comprises (as shown in Figs. 10a, 10b and 10c) at the upper portion of a frame structure 141 a support 142 adapted to be tipped about an axis 143 when a pair of pneumatic cylinders 139 are operated, four rollers 144 being mounted on this support for holding the die-carrier in position.

A roller-carrier 145 supporting three rollers 146 of adequate shape constitutes a conveyor track between the support 142 and the bridge 147 of the roundabout 6 where the dies are handled.

A pneumatic cylinder 148 provided with a special end piece 149 is disposed in axial alignment with the push member 133 so that their common axis merges in the axis of the die-carrier supported by the rollers 144 and of the die delivered by the circuit 6. This cylinder is provided with a hollow rod communicating with the rear face of the piston and having orifices formed in the vicinity of the end piece 149. A pair of graphite-spraying nozzles 165a, 165b are disposed above and below the conveyor 146, respectively.

The suspended casting devices illustrated in Figs. 11a and 11b are intended for transporting unitary cast-iron loads along the circuit 12.

These devices are suspended from a twin-rail track 150 through the medium of a trolley 151 and their body consists of a suitably shaped tube 152 having mounted thereon a protection screen or apron 153, a ladle-supporting bracket 154, a spout-supporting bracket 155 and, at its lower end, a roller 156 held in position by a washer 157 and a pin 158, this roller engaging cam members 159 carried by the centrifugal casting machines.

The unitary casting ladle 161 comprises two transverse pins 160, 162 adapted to engage corresponding notches formed in the ladle-supporting bracket 154. The pin 160 is so arranged as to permit the forward tipping of the ladle to pour its contents into the spout 163, the other pin 162 acting as a stop assisting in maintaining the ladle in its normal, horizontal position.

The linear extractor (reference 7, Fig. 1) is illustrated more in detail in Figs. 12a, 12b and 12c of the drawings. The extractor comprises a frame structure 170 supporting the conveyor track 187 of circuit 6 and the mechanisms set forth hereafter:

A pair of pneumatic cylinders 171 secured on a support 176 oscillating about a shaft 177; this support 176 is controlled in turn through a pneumatic cylinder 175 and both cylinders 171 are adapted, through suitable linkage means, to actuate a pair of catches 172 holding the upper half of the die carried by a trolley along the circuit 6;

Another pair of pneumatic cylinders 173 holding by means of the catches 174 the lower half of a die carried by a trolley along the circuit 6;

A third pair of pneumatic cylinders 178 secured on a pair of rocking arms 182 adapted to actuate a corresponding pair of forearms 180 pivoted on shafts 181 and carrying at their outer ends studs 188 adapted to engage the cavity of the centrifuged tube 189 when the forearms 180 are rotated by the cylinders 178.

In this arrangement, the arms 182 are adapted to oscillate about a shaft 190 when the cylinder 183 is actuated, to take the position indicated in broken lines at 184 in Fig. 12b.

The pneumatic cylinder 185 is adapted to actuate an anchoring device 186 for locking the trolleys in position and subsequently to remove the trolleys from the station (see Fig. 12b).

A trolley and a track section of circuit 6 are illustrated by way of example in Figs. 12a, 13a, 13b and 14a, 14b.

This trolley consists of a rigid structure 202 carrying on the same side a pair of grooved rollers 203 and on the other side a single plain roller 204 so that the two grooved rollers engage the same rail and the plain roller the opposite rail.

The trolley is provided with a support 205 having wedges 206 for receiving the casting die.

The track proper consists of four circular-sectioned rails 200 arranged as illustrated in Fig. 14b and interconnected by a frame structure 201 on which these rails are welded or otherwise secured.

Operation

The operation of the installation will now be described with specific reference to Figs. 1 to 4 of the drawings.

The die-carrier filled with a fresh die is deposited at station 14 on the roundabout 1 (Fig. 2a), the motion of the roundabout 1 causing it to move past the following stations in succession: station 15 where the centrifugal casting machines start, casting station 16, centrifuging or rotating station 17 and stopping station 18 where the centrifugal casting machine is separated from its die-carrier which rolls towards the stripping station 4 (Fig. 2b) where the die containing the cast tube is separated from the die-carrier as the die-carrier 21 proper is returned to the replenishment station 5 (Fig. 2c), the die 19 being transferred to the extraction station 7 where the cast tube 20 is separated from the die.

The tube is ejected and rolls towards the stockage place 9, the empty die being carried along toward the conditioning tunnel 10 at the output end of which it is coated or sprayed by the device 11 before passing to the replenishment station 5 (Fig. 2d) where it is prepared or conditioned and introduced into the empty die-carrier 21. The replenished die-carrier rolls again towards the loading station 14 of the centrifugal casting machines and the cycle is recommenced.

The general disposition of the installation is illustrated diagrammatically in Fig. 3: the cast-iron is prepared in the electric furnace 23 and the filled ladles are transferred by means of an overhead conveyor 22 from the furnace to the station 24 where the unitary ladles 13 of conveyor 12 are filled from the larger, common ladle.

Another general view of the installation is shown in perspective in Fig. 4.

Now the different operations carried out at each station will be described in detail.

When the machine is started, the roundabout 1 is rotated continuously by the wheel 32, reduction gear 44, variable-speed gear 38 (permitting a proper adjustment of the roundabout velocity) and electric motor 33.

The die-carrier is lowered onto the roundabout and moved in succession to station 15 where the centrifugal casting machine is started automatically and then to station 16 where the unitary ladles 13 suspended from the devices illustrated in Figs. 11a and 11b are fed along the conveyor circuit. The rollers 156 of these ladle-carrying devices engage the cams 159 of the centrifugal casting machines (Figs. 11a, 11b) so as to follow the roundabout contour during a short time as required for the operator to tip the ladle 161 and pour its contents into the spout 163 overlying the corresponding centrifugal casting machine. The cast tube is centrifuged or rotated at 17 and 18 and the die-carrier removed from the centrifuging machine at this latter station.

The die-carrier is taken by the fork 64 (Fig. 6c) and lifted automatically thereby as it moves past this fork; the tilting bridge 72 is first tipped by the thrust and then restored by the spring to its normal position in which it abuts the stop 75. At this time the cylinder 60 is actuated to lower again the fork 64 and the die-carrier is deposited on the bridge 72 and begins to roll along the ramp toward the stripping station 4.

At this station (Figs. 7a, 7b and 7c) the die-carrier is placed between the rollers 81 and the cylinder 91 actuates the rack-and-pinion device 92 to rotate two of these rollers 81. Thus the die-carrier is rotated and then stopped as its check member 93 engages the fixed stop 94. At this time the median or joint plane of each die is horizontal and the push member 96 exerts a thrust against the die-carrier, the other push member 85 driving the filled die first out from the carrier and onto the roller conveyor 88, and subsequently on the trolley 90. Both push members 85 and 96 are then retracted, the cylinder 97 lifts the cradle 80 until the latter engages the roller 98 and is tilted so as to eject the die-carrier onto the conveyor 99 leading to the replenishment station 5.

The trolley 90 loaded with the filled-die is transferred by gravity to the extraction station 7 by the double check member device 100, 101 (Fig. 8a) and stopped at this station by the stop members 186 (Fig. 12b). The four cylinders 171 and 173 engage the upper and lower die halves by means of the catches 172 and 174 respectively. The cylinder 175 rotates the support 176 through 90°, thus removing the upper die half. Both cylinders 178 are then operated to move the arms 180 toward each other and to cause their ends 188 to engage the cavity of the cast tube; at this time the cylinder 183 causes the arms 180 to move upwards and to carry along the cast tube to the position shown in broken lines at 184, then the arms 180 are moved away from each other to release the cast tube, and the latter rolls down the stockage ramp 191. Both arms 180 and the support 176 move downward to their initial positions, the die halves are reclosed and released by the cylinders 171, 173, the trolley 90 carrying the empty die is impelled toward the conditioning tunnel 10 by the cylinder 185, and a fresh trolley is substituted for the preceding one.

The trolley-carried die is driven by the impulses given to it by the conditioning tunnel 10 in which it receives an adjustable water spray for the purpose of keeping the die temperature at a substantially constant value during the die-replenishment operation. At station 11, situated at the output end of the tunnel, a coating is sprayed into the die by means of an automatic gun (Figs. 9a, 9b), the motor 117 being started automatically to reciprocate the gun support 112 by means of the driven chain 114; during this movement, the control arm 121 releases the spraying mechanism. When the gun has resumed its initial position the device is stopped automatically.

The conveyor trolleys 90 are transferred automatically from the coating station to the replenishment station 5 by means of the double-catch device 100, 101 (Fig. 8a) actuated by the pneumatic cylinder 103. At the replenishment station (Figs. 10a, 10b), as the conveyor trolley engages the pneumatic push member 133 the cylinder 148 is actuated, and the end piece 149 driven by the hollow rod of the cylinder is introduced into the die-carrier placed upon the support 142 and passes therethrough while ejecting compressed air through the orifices provided for this purpose at the outer end of the hollow cylinder rod; thus, the internal surface of the die-carrier is thoroughly cleaned. As the end piece 149 emerges from the other end of the die-carrier, an operator secures thereon one of the two refractory washers or pads to be fitted at the ends of the die. Then the cylinder 133 pushes the die toward the die-carrier past graphite-spraying nozzles 165a and 165b which form lubricating coatings on the die surface. As the die engages the end piece 149, the assembly is pushed inside the die-carrier, the cylinder 148 resumes its inoperative condition and releases the washer or pad previously carried by the end piece 149, the latter being retained at the inner end of the die-carrier by a special stop provided for this purpose. The washer or pad provided at the other end of the die-carrier is positioned by hand by the operator controlling the operation.

Upon completion of this operation, the operator actuates the control means provided for discharging the replenished die-carrier; the cradle 142 is tipped by the actuation of the pair of cylinders 139, and the die-carrier descends by gravity by rolling towards the loading station 14 of the centrifugal casting machines, until it engages a stop controlling the distribution of dies one by one on the waiting tilting bridge 68 (Fig. 6b), as a fresh die-carrier takes the place of the preceding one at the replenishment station. On the tilting bridge 68 the die-carrier is lifted by the fork 64 as the latter moves upwards; when the fork 64 has attained its uppermost position the cylinder 69 raises the tilting bridge 68 to permit the passage of the die-carrier as the fork 64 resumes its lowermost position. During its downward movement the fork 64 is retained in the waiting position by the two check members 78. The tilting bridge 68 is tilted back, a fresh die-carrier is released by the stop and placed on the bridge 68.

When the centrifugal casting machine is positioned beneath the bridge, the delayed-action-cylinders 76 deposit the die-carrier thereon and this carrier is transferred by the roundabout to the casting station, and the cycle is recommenced.

Of course, many modifications and alterations may be brought to the various arrangements and devices constituting the general installation according to this invention and it will be readily understood by anybody conversant with the art that those illustrated and described herein are only typical examples which should not be construed as limiting the present invention, the spirit and scope of which is clearly set forth in the appended claims.

I claim:

1. A semi-automatic installation for the continuous manufacture of cylinder liners for internal combustion engines by the centrifugal-casting method, which comprises a revolving platform driven at a constant velocity and carrying a plurality of centrifugal casting machines each adapted to receive a casting die supported by a die-carrier, a plurality of fixed stations positioned in relation to said platform in such manner that each of said machines moves past each of said stations in succession upon rotation of said platform, said stations including a first station for loading an empty die with its die-carrier on a casting machine, a second station at which each die is centrifuged, a third station at which the liquid metal is cast, and a fourth station for unloading each die and its die-carrier, a first circuit adapted to deliver liquid metal to small casting ladles and to bring each ladle into position above a casting machine, a second circuit comprising means overlying said platform for removing the die-carriers supporting filled dies from said machines at said fourth station, means for removing the filled dies from their die-carriers, means for re-introducing empty dies into their die-carriers, and means overlying said platform for replacing die carriers supporting empty dies on said machines at said first station, and a third circuit adjacent said second circuit comprising means to receive the filled dies, means to transfer said filled dies to a cast-tube extraction means, means to transfer the empty dies to stations at which the die surfaces are conditioned and prepared for a further casting operation, and means for transferring said dies to said means for re-introducing the empty dies into their die-carriers.

2. A semi-automatic installation for the continuous manufacture of cylinder liners for internal combustion engines by the centrifugal-casting method, which comprises a revolving platform driven at a constant velocity and carrying a plurality of centrifugal casting machines each adapted to receive a casting die supported by a die-carrier, a plurality of fixed stations positioned in relation to said platform in such manner that each of said machines moves past each of said stations in succession upon rotation of said platform, said stations including a first station for loading an empty die with its die-carrier on a casting machine, a second station at which each die is rotated, a third station at which the liquid metal is cast, and a fourth station for unloading each die and its die-carrier, a first circuit adapted to deliver liquid metal to small casting ladles and to bring each ladle into position above a casting machine, and a second circuit comprising means overlying said platform for removing the die-carriers supporting filled dies from said machines at said fourth station and means overlying said platform for replacing die-carriers supporting empty dies on said machines at said first station, means for removing the filled dies from their die-carriers after removal from said machines and means for re-introducing said empty dies into their die-carriers.

3. A semi-automatic installation as set forth in claim 1, which comprises in addition another circuit for delivering relatively large ladles filled with liquid metal for supplying the latter to unitary ladles of smaller size each corresponding to the filling of one die.

4. A semi-automatic installation as set forth in claim 1, wherein each die consists of two semi-cylindrical halves separated by a diametral joint plane.

5. A semi-automatic installation as set forth in claim 1, wherein the die-carriers for transferring the dies to the centrifugal casting machines consist of tubular elements carried by external rolling rings.

6. A semi-automatic installation as set forth in claim 1, wherein said centrifugal casting machines comprise rollers adapted drivingly to rotate and die-carriers.

7. A semi-automatic installation as set forth in claim 1, wherein said means for removing and replacing said die-carriers on said platform consist of forks displaceable vertically by means of fluid-operated cylinders and so disposed as to cause said die-carriers to be transferred between said second circuit and said platform through a vertical movement.

8. A semi-automatic installation as set forth in claim 1, further comprising a push member co-acting with members for holding the die-carrier against movement for transferring said die to a trolley circulating on the third circuit.

9. A semi-automatic installation as set forth in claim 1, wherein said extraction means comprises members adapted to so position each die that its joint plane is horizontal, and members for lifting the upper die half, other members for tilting the lower die half, and other members for stripping the cast-tube from said lower die half.

References Cited in the file of this patent

UNITED STATES PATENTS

| | | |
|---|---|---|
| 5,988 | Loregrove | Dec. 26, 1848 |
| 323,896 | Stock | Aug. 4, 1885 |
| 972,108 | Herbert | Oct. 4, 1910 |
| 1,634,914 | Reichold | July 5, 1927 |
| 1,830,427 | Devillers | Nov. 3, 1931 |
| 2,023,040 | Adams | Dec. 3, 1935 |
| 2,069,835 | Wurster | Jan. 26, 1937 |
| 2,225,173 | Hanson | Dec. 17, 1940 |
| 2,522,031 | Gavin | Sept. 12, 1950 |
| 2,727,288 | Saives | Dec. 20, 1955 |
| 2,733,490 | Yates et al. | Feb. 7, 1956 |